Aug. 21, 1951     J. C. FOX     2,564,890
SELF-INFLATING DECOY
Filed April 5, 1946     2 Sheets-Sheet 1
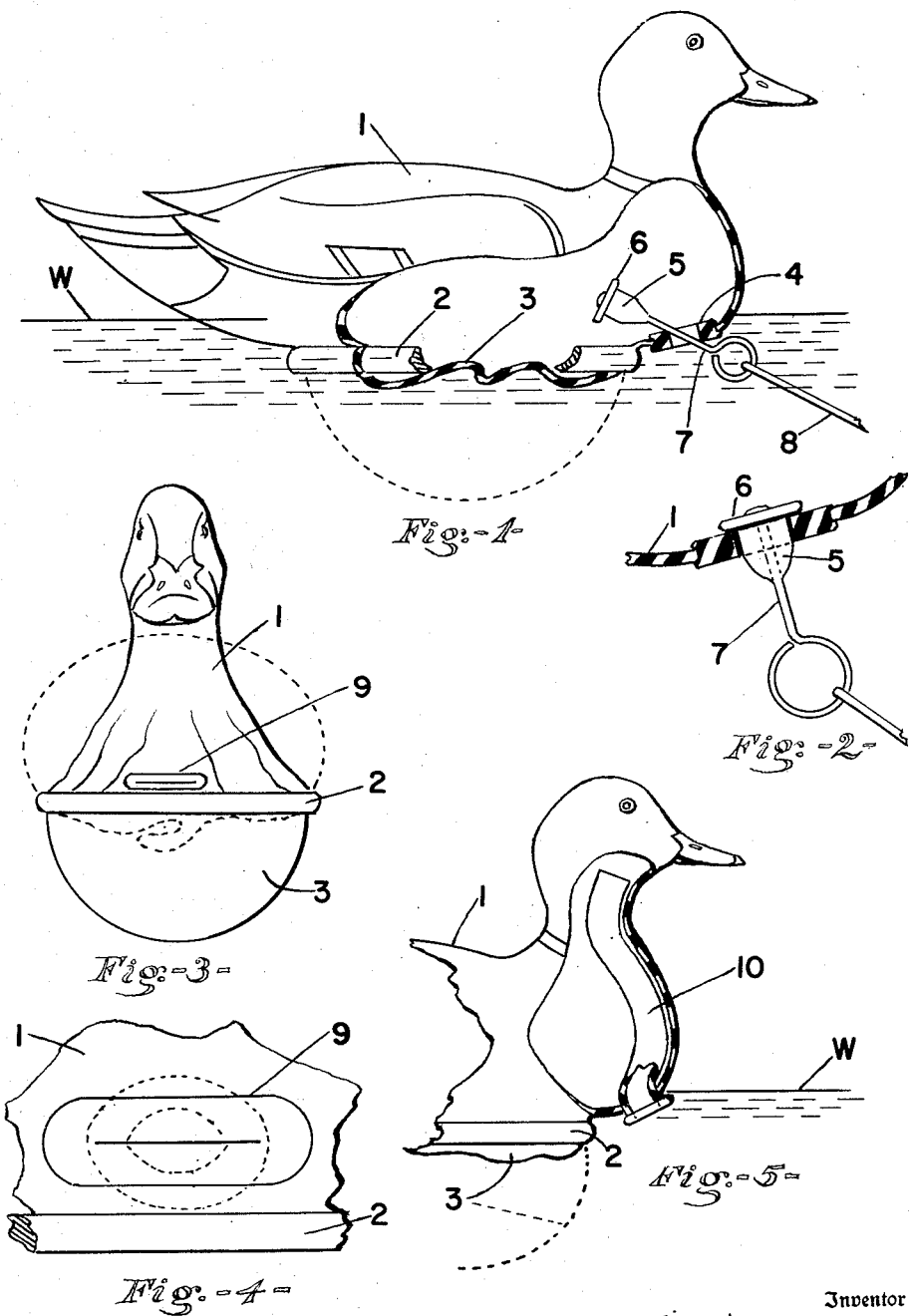
Inventor
Joseph C. Fox.
By Reynolds & Beach
Attorneys Aug. 21, 1951          J. C. FOX          2,564,890
SELF-INFLATING DECOY
Filed April 5, 1946          2 Sheets-Sheet 2
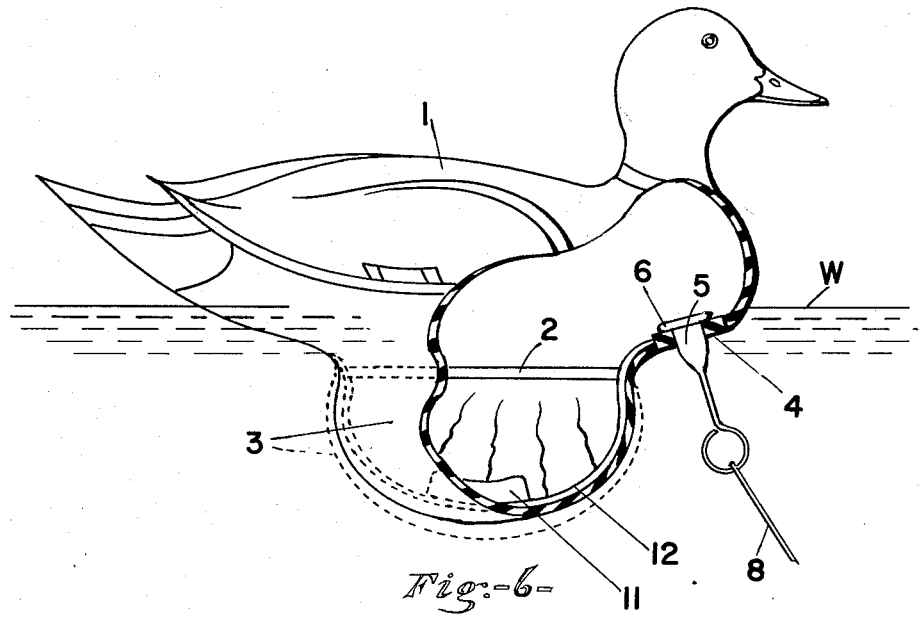
Fig.-6-
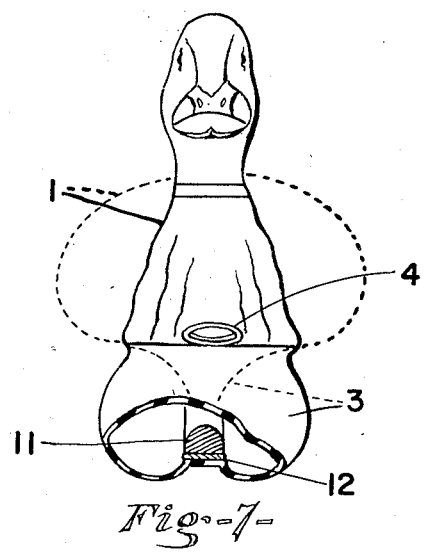
Fig.-7-
Inventor
Joseph C. Fox
By Reynolds & Beach
Attorneys

UNITED STATES PATENT OFFICE 2,564,890

SELF-INFLATING DECOY

Joseph Chester Fox, Seattle, Wash.

Application April 5, 1946, Serial No. 659,843

9 Claims. (Cl. 43—3)

Inflatable decoys for duck hunting have been proposed heretofore, but most of them have been so difficult to inflate, by a hunter in a blind, with a gun in one hand which he can not well lay down, and with cold fingers attempting to manipulate the valve, pump, etc. required for inflation, that they have not proven practicable. In my prior Patent No. 2,201,164, issued May 21, 1940, such difficulties were recognized, and as a solution it was proposed to make the decoy self-inflating, by the act of dropping the decoy, having an open-bottom skirt admitting freely to the interior of the body, upon the water's surface. This eliminated all valves, pumps, or other things requiring manipulation, under adverse conditions, but this decoy still has at least four drawbacks which are inherent in its structure.

Such an open-bottomed decoy must have a skirt depending well below the water level, to trap sufficient air for displacement into and for plumping the body of the decoy into life-like form. This depending skirt, however, is seized upon by tidal currents, tending to draw the decoy in one direction, and if wind action or wave action tends to move the decoy in a different direction, the body is tilted badly, and loses its natural appearance. Still, a skirt of material depth appears unavoidable in an open-bottom decoy.

Another disadvantage of the open-bottomed form of my prior patent arose from the manner of its use. Customarily, the hunter throws the decoy away from him, to land upon the water. If the open-bottomed decoy fills completely with air, like a parachute, while falling, so much air is trapped within it that it floats too high. Contrariwise, if it is tilted when it alights upon the water, too little air may be trapped within it, and it may float too low. It was difficult to trap and contain the correct, predetermined amount of air to cause it to plump out and float correctly. Then, too, such an open-bottomed decoy, when subjected to excessive wave action, or if inadvertently run down by a boat when setting out or taking in a number of decoys, or run into by a retriever, may be entirely swamped and sunk, since all air is free to escape when the decoy is tilted or rolled over far enough to permit its water-seal to be broken.

Again, there are times when it is desired to hunt over grass or stubble fields. An open-bottomed decoy will only seal itself against loss of air while it floats, and consequently it can not be plumped out while standing in a field; it simply slumps limply to the ground.

Accordingly, the primary aim of the present invention is to provide a collapsible, self-inflating decoy having substantially all the advantages of my former decoy, and possessing four further advantages; first, the ability to float with little of the structure at any appreciable depth below the water line, and thus the decoy need be subject only to a minimum degree to current action; second, the ability to trap within the decoy, with certainty yet without measurement, such predetermined quantity of air as will plump the decoy out into life-like form, and cause it to ride at proper level, not too high nor too low in the water; third, the ability to remain floating even when entirely capsized by practically any external force, such as by collision with a boat or excessive wave action; fourth, the ability to be inflated and to remain inflated indefinitely when placed in an open field, yet to be readily and promptly deflated when that is desired.

Furthermore, in tall grass, weeds, etc., the ordinary decoy becomes hidden, and hence ineffective. A further object of this invention is to provide means whereby the decoy may be supported at an appreciable elevation from the ground, so that it will be more clearly visible under such conditions.

Likewise, in common with the decoy of my prior patent, it is an object here to provide a decoy which is easily, quickly, and with a minimum of difficulty extensible and collapsible; of small bulk when collapsed, and of light weight, so that a hunter may readily carry a goodly number; stable when floating, and unsinkable by heavy waves or collision with a boat; rugged, yet easily repairable should it be punctured with shot, or snagged and torn; and easily manufactured, at small cost.

It is also among the objects of the present invention to provide a decoy having certain detail improvements in construction; for example, instead of sealing by a spring-actuated valve the access opening whereby communication is afforded between the exterior and the interior of the decoy, a manually operable valve is employed, so that it may be opened and left open for free admission of air to the interior as a preliminary to inflation, or for ready expulsion of air from the interior in the process of deflation, and may be closed easily, and at will, when the decoy contains sufficient air for its inflation, though such closure is not essential, and no harm arises for want of full closure; also, the access aperture is made small, so that while air may enter for inflation, or be expelled, with sufficient rapidity, there will be no material loss of air therethrough when the decoy is dropped upon the water, should the closure means be loose, or become unseated; furthermore, the closure means for such access opening is so formed that, if it is left loose, or becomes loosened, it will be reseated by the tugging of the decoy at its anchor or tethering line, since the closure is preferably formed, as part of the securing means for such a line; in addition, a decoy formed according to the present invention may be easily and cheaply manufactured and assembled.

The invention, then, comprises the novel decoy, and the novel arrangement of the several parts thereof in relation to one another, as shown in the accompanying drawings in several typical forms, and will be hereinafter more particularly disclosed, and as defined in the claims which terminate this specification.

Figure 1 is a general side elevation, partly broken away, showing the decoy in its floating position.

Figure 2 is a detail of the sealing and anchoring means, in the form illustrated in Figure 1.

Figure 3 is a front elevation, illustrating the decoy in the general form of Figure 1, but incorporating a modified form of closure for the access opening, and Figure 4 is an enlarged front view of such access opening, and its self-sealing closure.

Figure 5 is in part a fragmentary side elevation and in part a section, illustrating a modified form of the access opening.

Figure 6 is a side elevation corresponding somewhat to Figure 1, and with parts broken away to show a modified form of the decoy, and Figure 7 is a front view, partly broken away, of the same form.

The decoy of this invention may be considered as made of two hollow, collapsible parts, a body 1 which becomes lifelike when plumped out, and a pouch 3. Each such part freely communicates with the interior of the other through the ring 2, but together, in their limp or suspended form as indicated in Figure 3, they contain a volume of air which is sufficient to plump the body 1 into life-like form when the pouch is deflated by displacement of its air into the body by the upwardly acting hydraulic or other force, as is shown in Figure 1. The ring 2 should be of material size, and have some appreciable weight, and should be relatively stiff or inherently form-sustaining, so that when the body is held by the back or head, the ring will distend or tend inherently to hold distended the bottom part of the body, and the pouch. Air to fill such volume will enter at the access opening defined, for example, by the grommet 4, provided the closure plug or valve 5 is not seated in such grommet, as normally it would not be while the decoy is collapsed. Before dropping or throwing out the limp decoy upon the water the plug may be pulled by its protruding stem 7 into sealing position, with the flange 6 seated at the inner face of the grommet, although, since the grommet aperture is restricted, and is located in a downwardly facing wall of the decoy, such as beneath the breast, which is submerged when the decoy is in use, no material amount of air will be lost in dropping the decoy upon the water nor while it floats, should the closure means be or become loose. Moreover, since it is intended to secure the tethering or anchor line 8 to the external ring of the stem 7, the natural tugging upon such line will tend to seat the closure, or to retain it seated. The grommet serves also to reinforce the decoy wall for such securement point, and a duplicate reinforcement for the latter purpose need not be provided.

The use of a stiff ring 2 to afford some tendency to hold the body and pouch initially partly distended is but one way of accomplishing this result. It is advantageous, in that a ballast weight so located is desirable, and the ring thus serves a dual purpose. If desired, the inherent distensibility of the body and pouch may be otherwise achieved, in which case the ring 2 need not be stiff, or may be omitted altogether, and ballasting may be otherwise accomplished—for example, as will be suggested with reference to Figures 6 and 7.

The shape, size, and decoration of the body are such as will suit it to its intended use. It is preferably made of rubber, molded or otherwise formed to shape, and painted. If punctured it is readily patched and repaired. It should be, at least above the water line, impervious to water and air. The ballast or stiffening ring 2 may be incorporated into the body in the process of manufacture, and could be made of wire cable, of rubber, or of any suitable material having some mass and inherent stiffness so that it will hold its distended shape, yet at the same time being flexible so that it will not be damaged in handling, especially when the decoy is collapsed. By making the ring of large area, the stability of the decoy is increased. The pouch may be of material similar to that of which the body is made, and fits tightly entirely about the ring.

The access opening may take other forms, and thus in Figures 3 and 4 the grommet 4 and plug 5 are replaced by a slitted closure 9, which inherently tends to remain substantially closed, but which, if pressed endwise, as indicated by the dotted lines in Figure 4, will open. In Figure 5 a tube 10 has been shown leading from a point such that its lower end will be submerged when the decoy floats, upwardly into the hollow head of the decoy, thus to make practically impossible the entrance of water, which would have to rise to the top of the tube 10 in order to enter the hollow body and pouch of the decoy.

The decoy would normally be transported to the blind or to the duck flat in collapsed shape, and it will take up substantially no more room than is represented by the ring 2, and even this, to a certain extent, can be collapsed. In other words, the decoy can be completely deflated and collapsed flat, like an elliptical pancake. In order to accomplish the deflation the plug 5 is pressed inwardly to leave the hole through the grommet 4 open. Arrived at the blind, the hunter picks up the decoy by the back, or by the bill, shakes it out, and it will assume a position somewhat as indicated in Figure 3, with the body limp but held somewhat distended by the ring 2, and with the depending pouch quite well filled with air. A certain amount of air will enter the decoy through the open, though restricted, access aperture at 4, to permit this limited amount of distention. Now the plug 5 may be drawn into the grommet to seal the aperture, though no harm will result if this is not done immediately, but the aperture is merely left open. In either case the decoy is thrown out or dropped upon the water, the ring 2 serving as ballast, and immediately it strikes the water the pouch 3, which is lowermost, is pressed upwardly towards or within the body, moving thereinto through the ring 2, and the pouch is thus deflated from the dotted line position of Figure 1 to the full line position thereof. Since the grommet 4 is submerged, air will in no case escape to any material extent through it, but all the air which was in the pouch is now forced upwardly into the body, and the predetermined volume trapped within the pouch and body combined, when the limp but partially distended decoy was held in the hand, is now contained within the body alone, and this volume can be so calculated as to effect complete distention of the body, or its plumping into life-like form. Also, this air renders the decoy buoyant, and it floats at the correct level upon the water.

It has been indicated that no harm will result if the valve 5 is not closed or seated when the decoy is thrown upon the water, and such is indeed the case. However, it is most desirable that this valve be securely closed, to render the decoy completely water-tight, whenever the decoy is in use. Any extraneous influence which might cause it to capsize or roll over would probably not permit escape of all air from its interior through the restricted opening, were the valve loose, but enough air would be lost to make the decoy logy, and assume an unnatural position on the water, thus defeating its intended purpose. In extreme cases it might collapse flat, or even sink. Thus it is greatly to be preferred that the valve 5 be always securely closed before the decoy is placed in use.

In particular it will be noted that while the ring 2 serves as a weight, and affords a broad base, to maintain stability of the decoy, there is not, in the form shown in Figures 1 to 5, any depending skirt or other mass which affords to tidal currents any grip on nor influence over the decoy. The decoy rides so nearly upon the surface of the water that it is acted upon to the minimum extent by tidal currents. The amount of air within it is predetermined, and not subject to caprice as it falls, hence the flotation level is always correct. Winds may serve to blow the decoy one way or the other on its anchor line 8, and this tugging in itself may pull the plug 5 into or hold it in sealing position, but the decoy will not keel over, as was the case where tidal currents and wind action were operating relatively crosswise upon the decoy of my former patent. Even should violent wave action, or accident, roll the decoy over, it does not lose its buoyancy, since the flotation air is sealed in; even if the plug 5 is loose, insufficient air is lost in such an accident to sink the decoy.

In the form shown in Figures 6 and 7 the decoy, in all essential respects, is the same as has already been described, but in this particular form a weight 11 is provided, supported upon a stiffener band 12 which extends more or less longitudinally of the pouch, from the junction of the pouch and body at the front to the same junction in the rear. The weight 11 thus acts as a keel or ballast mass at a level appreciably below the water level, to stabilize the decoy. The pouch may still collapse, as is indicated in Figure 7, and its volume is still calculated at such value that with the degree of collapsing which is permitted it, and including the volume of air trapped within the limp body, the body will still be plumped into life-like form by the collapse of the pouch, even though this collapse may not proceed to the same extent as does the pouch in the other forms of the invention. Such a decoy still retains the advantage of a complete closure, except for the restricted access aperture, and affords the additional advantage of a more stable decoy in places where conflicting air and water currents need not be reckoned with.

The decoy with a closed pouch has a further advantage over the decoy of my previous patent in that, since a certain volume of air can be trapped and substantially held without appreciable leakage, the decoy can be used in grass or stubble fields. It may be held, as is indicated in Figure 3, and then, with the closure at 4 or at 9 closed, so that there is substantially no leakage of air at this point, the decoy may be dropped down upon the ground, and its pouch, collapsing within the ring 2, will, as previously described, plump the body 1 into life-like form, and retain it in this form, whereas with a bottom opening that cannot be closed, the decoy will not retain its plump form for field shooting. The ring 2, of large area, affords a stable base when used thus, as well as when floating. Should it be desired to use the decoy in weeds or high grass or stubble, where greater elevation is desired than would be possible by the manner of use just indicated, the present decoy has the capability of being further inflated simply by blowing into its access aperture, and then by closing the valve the inflation of both the body and pouch can be retained, and the decoy can rest upon its pouch, at an appreciably greater elevation than if it rests upon the ring 2.

The decoy is readily collapsed and transported, and when it is to be used, no positive action need be taken other than to shake it out, to permit it to distend in a natural manner, and simply to the extent required by the stiffening ring 2, or by the inherent tendency of its walls to separate. If indeed the hunter, after shaking out the limp decoy, desires to seal the grommet aperture, this is easily accomplished, even though he has no free hand, by grasping the stem 7 in his teeth, and thereby drawing the plug 5 into sealing position.

I claim as my invention:

1. A self-inflating decoy comprising a hollow body of flexible, semi-stiff, impervious material, of a shape when plumped out to represent, above the water surface, a floating wild fowl; a hollow collapsible pouch departing from the natural contour of such wild fowl, and joined to and pendent from the submersible portion of the body when the decoy is suspended in the air by an upper portion, and likewise of flexible, impervious material, limp and non-form-sustaining; the interiors of the hollow body and of the hollow pouch being in free communication for unrestricted passage of air from each to the other, and constituting effectively a single closed chamber which, if fully inflated would resemble the body of the wild fowl with a bulbous excrescence therebelow; the stiffness of the material of the decoy as a whole being such as will permit it to hang limply in air, but giving it an inherent tendency to remain partially but less than fully distended, whereby when thus hung limply it will envelop in such closed chamber a volume of air less than sufficient to plump it when it is not water-borne, but sufficient, when the decoy is water-borne and the total volume of such chamber has been decreased by the upward collapse of the otherwise pendent pouch under the influence of the buoyant force acting upon it, to plump the body into lifelike resemblance to the represented wild fowl, and to support it buoyantly and stably, and a ballast weight connected to and tending to submerge the body portion, but leaving the pouch upwardly collapsible as stated.

2. A self-inflating decoy as defined in claim 1, having an aperture admitting from the exterior to the interior of its chamber, for admission of air to supply any deficiency in its initial limp volume, or for expulsion of air in excess thereof, said aperture being located in the submersible portion of the decoy in a position to be water-sealed and to trap the air within the reduced-volume chamber, when the decoy is water-borne.

3. A self-inflating decoy as defined in claim 1, having an aperture admitting from the exterior to the interior of its chamber, for admission of air to supply any deficiency in its initial limp volume, or for expulsion of air in excess thereof; and a closure for such aperture to seal therein the requisite volume of air.

4. A self-inflating decoy as defined in claim 1, having a self-closing aperture admitting from the exterior to the interior of its chamber, for admission of air to supply any deficiency in its initial limp volume, or for expulsion of air in excess thereof.

5. A self-inflating decoy as defined in claim 1, wherein the juncture of the body and the pouch is defined by a somewhat elliptical opening, at the lower portion of the body, which is submerged when the decoy is water-borne, and which is of smaller size than the plumped extent of the body, which opening constitutes the means of communication between the body and the pouch, the ballast weight being suspended generally equally from opposite margins of such opening, but leaving the pouch susceptible of upward collapse when the decoy is water-borne.

6. A self-inflating decoy as defined in claim 1, wherein the juncture of the body and the pouch is defined by a somewhat elliptical opening, of smaller size than the plumped extent of the body, which constitutes the means of communication between the body and the pouch, and a hoop of appreciable mass outlining such opening, and constituting the ballast weight for the buoyant decoy.

7. A self-inflating decoy as defined in claim 1, having an aperture admitting from the exterior to the interior of its chamber, for admission of air to supply any deficiency in its initial limp volume, or for expulsion of air in excess thereof; and a stiffener ring outlining the opening at the juncture of the body and the pouch, and serving to maintain the decoy partially distended when limply suspended, and thereby to automatically draw in through said aperture a volume of air sufficient to effect subsequent plumping of the body, or to expel any air in excess of such volume.

8. A self-inflating decoy as defined in claim 1, including means pendent below the bottom of the hollow body, and there joined to the wall of the pouch, to limit the collapse of the latter, and to constitute in effect a keel-like stabilizer for the decoy.

9. A self-inflating buoyant decoy comprising an upper body portion and a lower pouch portion watertightly joined about an ellipse which is located where it will be submerged while the decoy floats, the body portion and the pouch portion being each of flexible, impervious material, of a stiffness such that the body portion tends to be form-sustaining when plumped out in the manner hereinafter set forth, and yet of a limpness such that the decoy as a whole will hang formlessly, with the pouch portion pendent beneath the body portion, when the decoy is suspended in air by the body portion; the interiors of the body portion and of the pouch portion being in free communication and constituting in effect a single closed chamber, adapted to contain a volume of air less than sufficient to plump the body portion when the decoy is not water-borne, but sufficient, when the decoy is water-borne and the air in the previously pendent pouch portion is forced into said body portion by the upward collapse of said pouch portion under the influence of the buoyant forces acting upon it, to plump the body portion into lifelike resemblance to the represented wild fowl, and to support it buoyantly; and a ballast weight at the elliptical juncture of the body and pouch, where said weight will be submerged while the decoy floats, and will stabilize the same, and the pouch will be free to collapse as stated.

JOSEPH CHESTER FOX.

REFERENCES CITED

The following references are of record in the file of this patent:

UNITED STATES PATENTS

| Number | Name | Date |
| --- | --- | --- |
| 86,127 | Bennett | Jan. 26, 1869 |
| 93,293 | Foster | Aug. 3, 1869 |
| 512,810 | Curlin | Jan. 16, 1894 |
| 934,342 | Oliver et al. | Sept. 14, 1909 |
| 1,464,107 | Pedersen | Aug. 7, 1923 |
| 2,201,164 | Fox | May 21, 1940 |
| 2,423,890 | Hurt | July 15, 1947 |

FOREIGN PATENTS

| Number | Country | Date |
| --- | --- | --- |
| 328,889 | France | Jan. 28, 1903 |